J. Taylor,
Bread Slicer.
No. 97,728.
Patented Dec. 7, 1869.
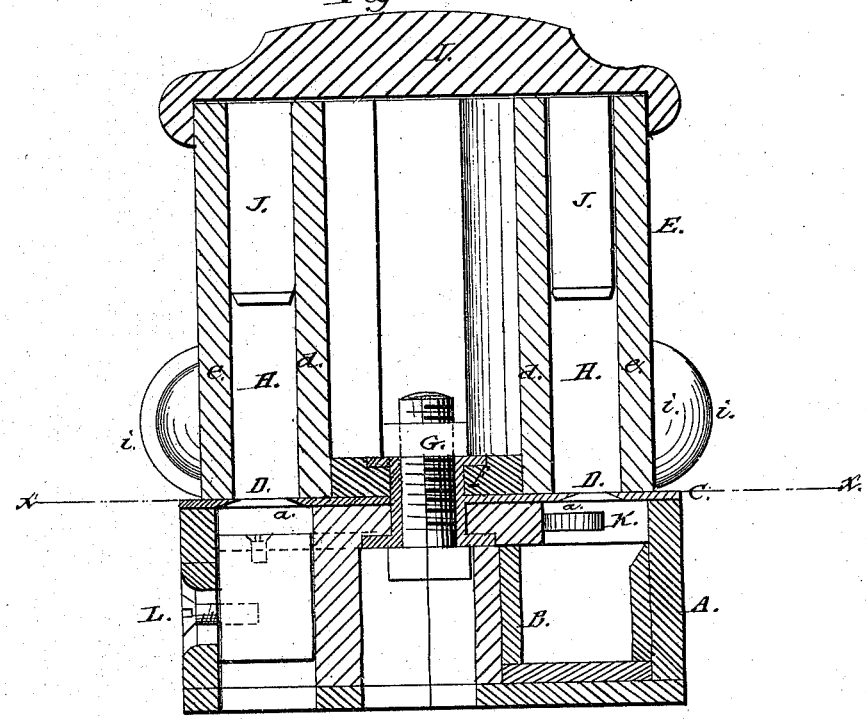
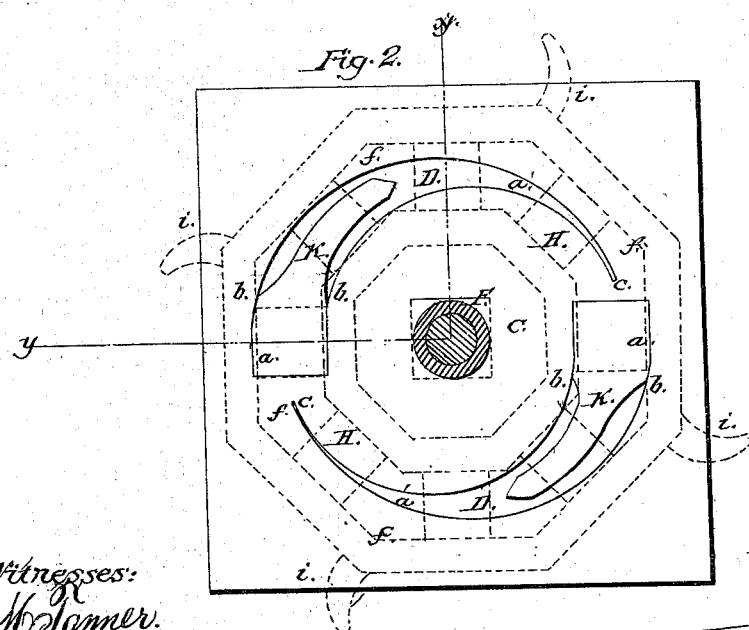
Witnesses:
A. M. Tanner.
S. C. Kenow.
Inventor:
J. Taylor
per Munn & Co.
attorneys

United States Patent Office.

JOSEPH TAYLOR, OF HUDSON, NEW JERSEY.

Letters Patent No. 97,728, dated December 7, 1869.

---

IMPROVEMENT IN BREAD-SLICERS.

---

The Schedule referred to in these Letters Patent and making part of the same.

---

*To all whom it may concern:*

Be it known that I, JOSEPH TAYLOR, of the city and county of Hudson, in the State of New Jersey, have invented a new and improved Bread-Slicer; and I do hereby declare the following to be a full, clear, and exact description of the nature, construction, and operation of the same, reference being had to the accompanying drawings, forming part of this specification, in which—

Figure 1 is a transverse vertical section of my improved bread-slicer, taken in the plane of the line $y\ y$, fig. 2.

Figure 2 is a plan view of the lower box, the upper case being removed, as indicated by the line $x\ x$, fig. 1.

The invention has for its object to provide a machine by which loaves of bread may be readily sliced in large or small quantities; and It consists in arranging a revolving case, containing the loaves of bread to be sliced, upon a fixed base or receiving-box, provided upon its upper surface with horizontal cutters, by which, as the case is revolved, the slices will be cut from the loaves, and permitted to drop into suitable drawers contained within the fixed base.

The invention further consists in the construction of the cutters, and in the means for regulating the thickness of the slices to be cut; and The invention consists, lastly, in the construction of the cover for the revolving case, by which the loaves of bread are pressed upon the cutters.

In the accompanying drawings—

A is the fixed base or box of rectangular or quadrangular form, and of suitable height to receive in one end the drawers B.

C is a metal plate forming the top of the box, and secured firmly thereto. Through this plate are formed two half-crescent shaped openings, D, arranged as shown in fig. 2.

Each opening, at its widest end, $a$, is of rectangular or quadrangular form, and from the point $b$ to the point $c$, the edges are shaped to form cutters, $a'$.

E is the case for receiving the loaves of bread, connected to the base A, in such a manner as to revolve freely thereon, by means of the sleeve F and screw-bolt and nut G.

The receiving-case E is of octagonal or other proper form, and provided with a series of vertical openings, H, formed by the inner and outer walls $d\ e$, respectively, and the partitions $f$. A plan view of this case and its openings is shown by dotted lines, fig. 2.

The openings H are designed to receive and conduct the loaves of bread to the cutters, and are of the proper size for that purpose.

The cover I, of the case E, is of suitable form, and provided upon its under side with a series of projecting bars or plungers, J, corresponding to the openings H, in size, form, and number, and are designed to rest upon and press the loaves of bread in contact with the cutters.

The operation is as follows:

The bread to be sliced is placed in loaves within the openings in the case E, and the cover adjusted to permit the plungers to bear upon such loaves.

The case is then revolved in the direction of the arrow, (shown in fig. 2,) by means of the ears $i$, affixed to the exterior of the same.

The lower loaves within the case project through the base or widened ends of the openings D, resting upon curved plates K, placed beneath the plate C, and as the case continues to revolve, the loaves are brought in contact with the sharpened edges of the cutters $a'$, which operate thereon with a shearing cut, from the points $b$ to $c$, cutting the slices from the loaves, and permitting them to drop into the drawers B.

Access to the sliced bread is obtained by extending the drawers, as will be readily understood.

The plates K are adjustable vertically within the case A, by means of the adjusting-screws L, to regulate the thickness of the slices to be cut.

By my improvement, bread, meat, or vegetables can be conveniently and expeditiously sliced, in any desired quantity to supply the largest demands. For hotels and restaurants, it will be invaluable, and for general use, it supplies a want long felt in the market.

Having thus described my invention,

What I claim as new, and desire to secure by Letters Patent, is—

1. The combination of the base A, revolving receiving-case E, and plate C, forming cutters $a'$, substantially as described, for the purpose specified.

2. The cover I, constructed as described, with the plungers J, and adapted to press the contents of the openings H within the revolving case, in contact with the cutters $a'$, substantially as described, for the purpose specified.

3. The adjustable plates K, in combination with the case A, revolving case E, and cutters $a'$, substantially as described, for the purpose specified.

JOSEPH TAYLOR.

Witnesses:
WILLIAM J. MCLEAN,
HENRY G. MCLEAN.